(12) United States Patent
Sweat et al.

(10) Patent No.: US 6,395,246 B1
(45) Date of Patent: May 28, 2002

(54) PREPARATION OF CALCIUM SILICATE AND SULFUR DIOXIDE

(75) Inventors: Samuel Franklin Sweat, Plant City, FL (US); Claude E. Breed, Florence; Kenneth E. McGill, Muscle Shoals, both of AL (US)

(73) Assignee: HF Extraction, LLC, Muscle Shoals, AL (US)

( * ) Notice: Subject to any disclaimer, the term of this patent is extended or adjusted under 35 U.S.C. 154(b) by 0 days.

(21) Appl. No.: 09/690,842

(22) Filed: Oct. 18, 2000

(51) Int. Cl.[7] ............................................... C01B 33/24
(52) U.S. Cl. ..................... 423/331; 423/541.1; 423/539
(58) Field of Search .............................. 423/331, 541.1, 423/539, 155, 178, 243.08, 224.02, 244.07, 651

(56) References Cited

U.S. PATENT DOCUMENTS

| | | | | |
|---|---|---|---|---|
| 4,075,284 A | * | 2/1978 | Johnson | 423/244 |
| 4,312,842 A | * | 1/1982 | Wilson, Sr. et al. | 423/178 |
| 4,415,543 A | * | 11/1983 | Wilson, Sr. et al. | 423/178 |

* cited by examiner

*Primary Examiner*—Steven P. Griffin
*Assistant Examiner*—Edward M. Johnson
(74) *Attorney, Agent, or Firm*—Jacobson, Holman, PLLC

(57) ABSTRACT

Nascent hydrogen and nascent oxygen are used to convert calcium sulfate and silicon dioxide to calcium silicate and sulfur dioxide.

17 Claims, 1 Drawing Sheet

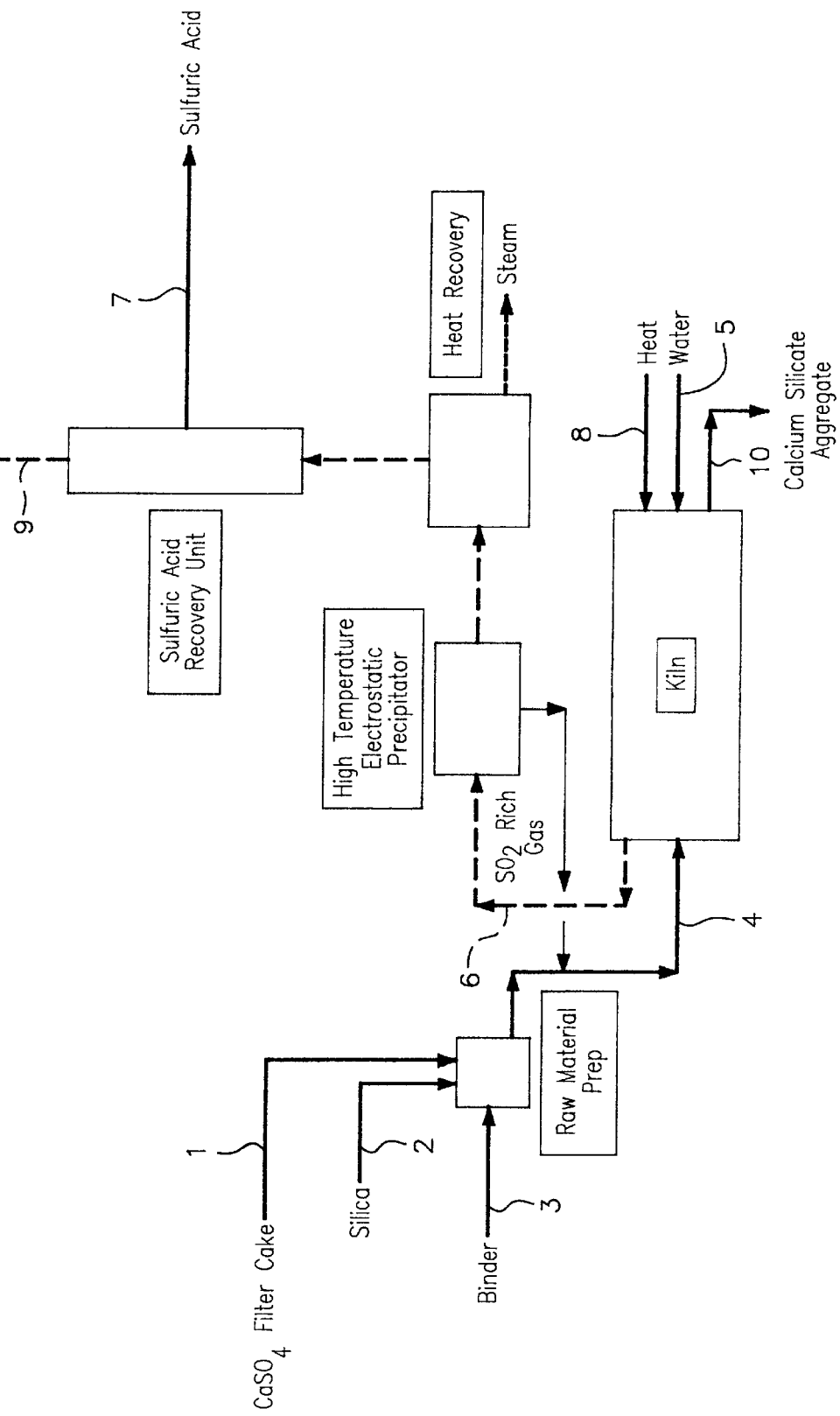

PREPARATION OF CALCIUM SILICATE AND SULFUR DIOXIDE

BACKGROUND

U.S. Pat. No. 2,232,099 (de Jahn) indicates that carbon is needed to reduce phosphogysum, but he recognized that silica would work only if alumina were present.

U.S. Pat. No. 2,687,946 and 4,687,947 (Manning) similarly teach that carbon is an essential component for the subject process.

SUMMARY OF THE INVENTION

Sulfur dioxide ($SO_2$) is released and recovered from calcium sulfate ($CaSO_4$) while generating a usable, environmentally friendly by-product, calcium silicate ($CaSiO_x$). A stochiometric amount of $CaSO_4$ particles is admixed with silica ($SiO_2$), e.g. in the form of sand, waste by-products, etc., and then introduced into a fuel-fired kiln.

Feeding water vapor into the kiln is critical to making the process work correctly. The water vapor is partially dissociated into nascent hydrogen ($H^0$) and nascent oxygen ($O^0$) at an elevated temperature in the kiln. The water vapor for the process is supplied by either direct water sprays or by steam injection.

At the elevated temperature of the kiln, the $SiO_2$, $H^0$ and $O^0$ react with the $CaSO_4$ to form $CaSiO_x$ and released $SO_2$ vapor. The $SO_2$ vapor exits the kiln in a discharge gas stream and is captured and recovered as sulfuric acid ($H_2SO_4$) in a typical commercially available tail-gas absorption/recovery unit, similar to those used in smelter operations.

Once the $CaSiO_x$ is formed, it passes through the kiln and is discharged and transported to outside storage stacks. As the $CaSiO_x$ is tumbled inside the hot kiln, it tends to granulate into mostly smooth particles that have a glass-like coating on the outside. All impurities that were contained in the $CaSO_4$ are trapped inside the glass-like coating. Depending upon the impurities in the $CaSO_4$, the glass-like coating can effectively prevent/reduce release of objectionable gaseous elements, such as radon. The $CaSiO_x$ particles are essentially insoluble and can be safely and effectively utilized for construction fill material, such as roadways, or as aggregate in cement. If the material is not sold, it can be stored in outside stacks that are environmentally friendly.

BRIEF DESCRIPTION OF THE DRAWING

The FIGURE is a process flow diagram illustrating an embodiment of the invention.

DETAILS

Phosphogypsum, gypsum or any other calcium sulfate is fed to a kiln heated to about 2800° F. (from 2200°, preferably 2500°, to 3000° F.), and water is added to cool formed clinker or aggregate and also is vaporized and dissociates (2 to 5% dissociation) as it traverses the kiln. The dissociated nascent hydrogen and oxygen react with the silicon dioxide to form $H_2SiO_x$ (silicious or silicic acid) where X is 3 or 4. This occurs to the silica phosphogypsum mixture fed to the kiln. The nascent hydrogen and nascent oxygen react with the silica to form silicious acid. The calcium sulfate reacts with the silicious or silicic acid under the high temperature (2200° to 2900° F.) and forms a crystalline/glasslike insoluble calcium silicate and releases sulfur dioxide gas. The sulfur dioxide ($SO_2$) gaseous emission is reclaimed, e.g., in a conventional sulfuric acid plant, producing sulfuric acid (98%).

With reference to the FIGURE and Table 1, phosphogypsum or gypsum (line #1) is fed to a mixing chamber where it is thoroughly mixed with a stream of silica (line #2). The mixture is optionally granulated or pelletized into a particle size that will make an efficient feed to the heated kiln. To help stick the materials together and form pellets, a binder may be used (line #3).

The pellets are then fed (line #4) to a gas, oil or coal-fired (line #8) kiln. A stream of water (in the form of either

TABLE 1

Description of Process Lines - $CaSO_4$ Regeneration

| Line # | Material | Composition | Description |
|---|---|---|---|
| 1 | Calcium sulfate ($CaSO_4$) | 50–100% $CaSO_4$ | Filter cake from a phosphoric acid plant, mineral feed, etc. |
| 2 | Silica ($SiO_2$) | 50–100% $SiO_2$ | Sand, waste amorphous silica from aluminum manufacturing, etc. |
| 3 | Binder | Calcium ligno-Sulfonate or equivalent | An effective binder to facilitate the pelletizing or granulating of the calcium sulfate/silica mixture. |
| 4 | Mixture of $CaSO_4$ and $SiO_2$ | $\geq$ Stochiometric Ratio | Pelletized mixture of the calcium sulfate and silica prior to being fed to the kiln. |
| 5 | Water or Steam | $H_2O$ at rate of up to 20 × stochiometric | Water spray or ~ 50 psig steam added through atomizing nozzles. |
| 6 | Mixture of combustion gas and $SO_2$ | — | The exhaust gases from the kiln. |
| 7 | $H_2SO_4$ acid | 5 to 10% | $H_2SO_4$ acid from the double contact acid train. |
| 8 | Natural gas, fuel oil, or coal | Standard | Heat source for kiln. |
| 9 | Clean air | nil % $SO_2$ | Clean exhaust to the atmosphere from the sulfuric acid plant. |
| 10 | Calcium silicate solids | $CaSiO_x$ containing all of the impurities present in the calcium sulfate | Solids discharge from the kiln. To be used for cement clinker, construction fill, roadbed, etc. | water or steam) (line #5) is injected into the discharge end of the kiln. The steam dissociates in the kiln and supplies the hydrogen and oxygen necessary for the reaction to go to completion. Because only about 2 to 5% of the steam dissociates readily, the amount of steam required is up to 20 times the stochiometric requirement.

The retention time in the kiln is about 2 to 4 hours; the optimum time is dependent on desulfurization of the clinker. The operating temperature for the kiln is about from 2200° to 2900° F.

Within the kiln, a reaction takes place; sulfur dioxide gas is liberated and a solid calcium silicate is formed. A rotary kiln is desirable, but not necessary, to allow insoluble calcium silicate to form into well-formed glassy pellets to facilitate their end use.

The sulfur dioxide gas exits the kiln with exhaust gases (line #6), and is recovered by a conventional double contact sulfuric acid plant which produces sulfuric acid at a concentration of up to 98% $H_2SO_4$ (line #7). A high temperature electrostatic precipitator may be required to insure a clean gas feed to the sulfuric acid unit.

Calcium silicate aggregate or clinker is formed during the reaction and is discharged from the end of the kiln (line #9). The produced calcium silicate aggregate or clinker contains essentially all of the impurities associated with the employed calcium sulfate, e.g. those in original phosphate rock from which phosphogypsum is derived. The calcium silicate takes on a glassy form and tends to encapsulate the impurities within an essentially inert shell. This inert material can then be safely utilized for construction fill, cement clinker, roadbeds, etc.

OVERALL REACTION $$CaSO_4 + 2H_2O + SiO_2 \rightarrow CaSiO_x + SO_{2(gas)}$$

INDIVIDUAL REACTIONS THAT OCCUR

1)
$$CaSO_4 \cdot 2H_2O \xrightarrow{\text{Heat (~300 degrees F.)}} CaSO_4 + 2H_2O$$

2)
$$H_2O \xrightleftharpoons{\text{Heat (~2800° F., 2-5\%)}} 2H^0 + O^0$$

3)
$$SiO_2 + 2H^0 + (x-2)O^0 \xrightarrow{\text{Heat (~2800° F.)}} H_2SiO_x$$

4)
$$2H_2SiO_x + CaSO_4 \xrightarrow{\text{Heat (~2800° F.)}} CaSiO_x + 2H_2O + SO_{2(gas)}$$

Whenever "about" appears in the disclosure or claims, a range of ±5% is contemplated unless otherwise indicated.

The term "nascent" is a term used to describe the abnormally active condition of an element. In the case of a diatomic element (such as $H_2$ or O2), it can exist in a monatomic state and be highly reactive, for example $H^0$ or $O^0$. The high temperature in the kiln creates the conditions for this phenomenon to occur which then results in the reaction mechanisms described.

The invention and its advantages are readily understood from the preceding description, and it is apparent that various changes may be made in the process and products without departing from the spirit or scope of the invention or sacrificing its material advantages. The process and products hereinbefore described are merely illustrative of preferred embodiments of the invention.

What is claimed is:

1. A method for producing calcium silicate and sulfur dioxide which comprises reacting a mixture of calcium sulfate and silica with dissociated nascent hydrogen and nascent oxygen at a temperature in the range of from about 2200° to about 3000° F. (about 1204° to about 1649° C.).

2. A method of claim 1 which consists essentially of reacting a mixture of calcium sulfate and silica with disso- ciated nascent hydrogen and nascent oxygen at a temperature in the range of from about 2200° to about 3000° F. (about 1204° to about 1649° C.).

3. A method of claim 1 which comprises reacting the mixture in the absence of carbon and/or alumina.

4. A method of claim 1 wherein the temperature range is from about 2500° to about 3000° F. (about 1371° to about 1649° C.).

5. A method of claim 1 wherein the temperature range is from about 2200° to about 2900° F. (about 1204° to about 1593° C.).

6. A method of claim 1 wherein the temperature is about 2800° F. (about 1538° C.).

7. A method of claim 1 wherein the calcium sulfate is in the form of gypsum or phosphogypsum.

8. A method of claim 1 wherein, prior to reacting, the mixture of calcium sulfate and silica is granulated or pelletized.

9. A method of claim 8 wherein said mixture is combined with a binder.

10. A method of claim 1 which is conducted in a rotary kiln.

11. A method of claim 1 which is conducted in a kiln from which sulfur dioxide is discharged in gaseous form and calcium silicate clinker or aggregate is discharged in a crystalline insoluble form.

12. A method of claim 11 wherein the calcium sulfate is in phosphogypsum form containing impurities, and discharged calcium silicate aggregate or clinker encapsulates the impurities within an essentially inert shell.

13. A method of claim 1 which is conducted in a kiln in which introduced water and/or steam is partially dissociated into nascent hydrogen and nascent oxygen.

14. A method of claim 13 wherein the water or steam is up to 20 times the stochiometric requirement.

15. A method of claim 1 wherein calcium sulfate, silica, disassociated nascent hydrogen and nascent oxygen are the sole essential reactants.

16. A method of claim 1 wherein the sole essential chemical reaction is that between calcium sulfate and silica in the presence of nascent hydrogen and nascent oxygen.

17. A method of claim 1 wherein the sole essential step is that of reacting a mixture of calcium sulfate and silica with disassociated nascent hydrogen and nascent oxygen at a temperature within the specified temperature range.

* * * * *